United States Patent Office 3,086,948
Patented Apr. 23, 1963

3,086,948
RESINOUS COMPOSITION COMPRISING HARD RUBBER DUST AND A DIESTER OF A BENZENE DICARBOXYLIC ACID AND AN EPOXY ALCOHOL
Helmut Pietsch, Dusseldorf-Holthausen, and Wilhelm Clas, Duisburg-Meiderich, Germany, assignors to Henkel & Cie. G.m.b.H., Dusseldorf-Holthausen, Germany, a corporation of Germany
No Drawing. Filed June 19, 1957, Ser. No. 666,750
Claims priority, application Germany June 25, 1956
7 Claims. (Cl. 260—3)

This invention relates to new resinous compositions suitable for use as sealing compounds, adhesives or binding agents. More particularly, the invention relates to such compounds using a base of hardenable epoxyalkyl esters of aromatic di- or polycarboxylic acids, a filler of a vulcanized organic compound containing sulfur and an amine hardening agent.

It is known that polyepoxide compounds may be used as sealing compounds, adhesives and binding agents. The polyepoxide compounds are hardened in a well-known manner when used for this purpose, that is, they are transformed into insoluble and infusible products. An important field of use of hardenable polyepoxide compounds is their use as adhesives for structural materials, especially for metals and for fibrous materials, such as wood or paper. Another important use is as sealing compounds for sealing hollow spaces in various apparatus, especially in electrical apparatus, cable connections, etc. In all these cases the polyepoxide compounds are often used in conjunction with fillers which do not always favorably influence the adhesive power. In the utility of an adhesive or a sealing compound, not only is the adhesive power and the durability of the compound of great importance, but also the durability of the material being joined together. For the determination of the durability of the adhesive compound, the test of practical use is applied and also measurement of the resistance of the adhesive compound against alternate bending, as described, for example, by K. Meyerhans in the magazine, "Kunststoffe," vol. 41, page 368 (1951).

We have now found that vulcanizates obtained by treatment of organic substances capable of being vulcanized with sulfur or other suitable sulfur compounds, such as $S_2Cl_2$ or other sulfur-halogen compounds, are useful as fillers for sealing compounds, adhesives or binding agents based on epoxyalkyl esters of aromatic di- or polycarboxylic acids. We have found that after hardening, these compositions result in adhesive bonds or sealing masses having a very high mechanical strength.

It is an object of this invention to produce hardenable resins which may be used as adhesives, binding agents or sealing compounds of high strength, based upon epoxyalkyl esters of di- or polycarboxylic acids.

Another object of this invention is to provide a filler compound for hardenable resins of the type described to be used as adhesives, binding agents and sealing compounds which result in a finished product of exceptionally high strength.

These and other objects of our invention may become apparent as the description thereof proceeds.

Aliphatic epoxyalcohols from which the epoxyalkyl esters used in accordance with the invention are derived may contain up to 6 carbon atoms in the molecule. This group of epoxyalcohols includes, for example, glycide, 1,2-epoxybutanol-4 or epoxycyclohexanol.

Aromatic di- or polycarboxylic acids with which the above alcohols may be esterified include, for example, monocyclic or polycyclic carboxylic acids wherein the carboxyl groups may be attached to the same cyclic nucleus or to different cyclic nuclei, if several aromatic nuclei are present. The aromatic radicals may be overlappingly joined to each other, or may be connected to each other in any other suitable fashion; for example, by a C—C linkage between carbon atoms of two different nuclei, through heteroatoms or through organic radicals. Heteroatoms or organic radicals which may serve as linking members between aromatic nuclei are, for example, —O—, —S—, >SO, >SO_2, >CO, —CONR—, >NR, hydrocarbon radicals, etc., wherein R is a hydrogen atom or represents an organic radical.

Among the aromatic di- or polycarboxylic acids from which the epoxyalkyl esters may be derived are primarily benzene dicarboxylic acids or benzene polycarboxylic acids, such as orthophthalic acid, isophthalic acid or terephthalic acid, naphthalene dicarboxylic acids, naphthalene tricarboxylic acids or naphthalene tetracarboxylic acids, diphenyl dicarboxylic acids, diphenyl tricarboxylic acids or diphenyl tetracarboxylic acids, ethylidene-bis-benzene carboxylic acids or other aromatic carboxylic acids in which the aromatic ring systems are linked through a hydrocarbon radical, as well as glycols or polyglycols, polyglycerins, etc., esterified at the hydroxyl groups with aromatic di- or polycarboxylic acids, such as bis-phthalic acid semiesters of ethylene glycol, propylene glycol, polyethylene glycols or polypropylene glycols.

The epoxyalkyl esters of aromatic di- or polycarboxylic acids used in accordance with the present invention also include the oily to wax-like or resin-like products which are obtained when alkali metal salts, especially potassium salts, of aromatic di- or polycarboxylic acids are reacted with epichlorohydrin in the presence of small amounts of water. The amount of water present during this reaction is generally less than 3%, preferably from 0.05 to 2%, of the carboxylic acid salt used in the reaction. Also resinous precondensates, such as those which are obtained, for example, by heating epoxyalkyl esters of aromatic di- and polycarboxylic acids with carboxylic acid anhydrides or carboxylic acid chlorides, especially with $BF_3$, dicarboxylic acid anhydrides or dicarboxylic acid chlorides, with polyalcohols, amines, amides, or other known hardening agents for epoxide compounds, and which contain at least 0.5% by weight of epoxide oxygen, may be used as starting materials.

The percentage of epoxide oxygen content increases with decreasing degree of condensation of the precondensate products or with decreasing molecular weight of the aromatic polycarboxylic acids or the epoxyalcohols, and reaches a maximum with the glycide esters of the benzene carboxylic acids. Pure phthalic acid diglycides esters, for example, contain 11.5% by weight of epoxide oxygen; this epoxide oxygen content rises in the tri-, tetra- and pentaglycide esters of benzene tricarboxylic acid, benzene tetracarboxylic acid and benzene pentacarboxylic acid until it reaches 14.2% by weight in the hexaglycide ester of benzene hexacarboxylic acid. It is preferred to use epoxyalkyl esters of aromatic polycarboxylic acids having an epoxide oxygen content within the range of 1 to 11% by weight.

The epoxyalkyl esters of polyvalent aromatic carboxylic acids used in accordance with the present invention should contain more than one epoxylalkyl ester group, preferably from 1.5 to 2 epoxylalkyl groups, in the molecule, and should be derived from polycarboxylic acids having from 8 to 30, preferably from 8 to 16, carbon atoms in the molecule.

Epoxyalkyl esters of the type above described are obtained, for example, in accordance with the process described in copending U.S. application Serial No. 377,713, filed August 31, 1953, by reaction of salts of polybasic isocyclic carboxylic acids or salts of acid esters formed by polybasic isocyclic carboxylic acid and polyvalent alcohols with those epoxide compounds which contain an exchangeable halogen atom. The reaction may also be carried out at elevated temperatures in the presence of nitrogen compounds especially in the presence of tertiary or quaternary ammonium compounds.

It is preferred to work with epoxyalkyl esters which are either liquid at room temperature — that is, at temperatures from 10 to 30° C. — or which can be caused to melt by heating to temperatures up to 100° C.

The sulfur-containing vulcanizates used in accordance with the present invention are products which may be obtained by heating organic compounds capable of vulcanization with sulfur, $S_2Cl_2$, or other sulfur-containing vulcanizing agents.

Organic compounds capable of being vulcanized are, for example, the latexes of natural or synthetic rubber. Among the products produced by the action of sulfur or sulfur-containing vulcanizing agents of organic compounds capable of being vulcanized are the various hard rubber types.

These substances are used in a finely divided state; that is, generally with a grain size of no more than 0.5 mm. preferably no more than 0.3 mm. There is no lower limit for the grain size of these fillers, and it is quite possible to employ the fillers with a grain size which lies within the order of magnitude of $1\mu$. For the purposes of the present invention, however, it is entirely sufficient to use fillers having a grain size from .2 to 0.01 mm., preferably from 0.2 to 0.1 mm.

The filler material may also be sulfur-containing vulcanizates in the form of industrial waste products, such as hard rubber dust such as obtained in comminuting technical products consisting of hard rubber, e.g., storage battery casings made of hard rubber. These materials often contain considerable quantities, for example, up to 75% by weight, preferably up to 60% by weight, of ash components, but the utility of these waste materials for the purposes of the present invention is not unfavorably influenced thereby.

The quantitative ratio of epoxide compounds and filler materials may vary within wide limits; for example, the epoxide resin admixed with the filler materials may contain from 5 to 90% by weight of filler material. In general, for each combination of a certain epoxide resin with a certain filler material there is a narrow mixture ratio within which optimum results are obtained; this mixture ratio is in most cases within the range of 25 to 50% by weight of filler material based on the weight of the mixture consisting of epoxide resin and filler material. The consistency of the compounded hardenable epoxide resin depends upon the consistency of the starting resin and the amount of filler material added thereto. If the starting resins are viscous, wax-like or solid, they are liquified by heating to temperatures up to 100° C. Prior to admixing them with the filler material. The hardening agent may also be added, but it is recommended to use the mixture consisting of resin, filler material and hardener for the intended purpose immediately after mixing, or not to admix the components until immediately prior to use. If the resins are liquid at normal temperatures, they are transformed into a paste-like consistency by adding the solid filler material, and this paste-like consistency is maintained even after adding the hardener. For this reason, the finished, hardenable mixtures are applied to the surfaces to be cemented with the aid of a trowel or with rollers. It is, however, entirely possible to obtain pourable mixtures by a proper choice of epoxide resins of suitable viscosity and a corresponding choice of the quantity and grain size of the solid sulfur-containing additive.

Any primary, secondary or tertiary amine which contains 2 or more amino groups in the molecule may be used as a hardener. The amines may contain aliphatic, aromatic, cycloaliphatic or heterocyclic organic radicals; among the aromatic amines those with monocyclic or polycyclic aromatic nuclei are included. For example, the following amines which contain from 1 to 10 carbon atoms in the molecule per nitrogen atom may be used as hardeners: ethylenediamine, diethylenetriamine, triethylenetetramine, piperidine, dicyandiamide, diacetoneamine, propylenediamine, and the like. The amount of hardener to be used may range from 5 to 20% for each part by weight of epoxide resin without filler.

In order to harden the hardenable mixture of epoxide resin, filler and hardener, it is not necessary to elevate the temperature; the hardenable mixtures harden at temperatures from 10 to 30° C. in the course of 4 to 6 hours. Of course the hardening action may be accelerated by elevating the temperature, for example, up to 50, 75, 100, 150 or 200° C., whereby the hardening period is very much shortened.

Since the products obtained in accordance with the present invention harden without any appreciable shrinkage, they are especially well suited for use as sealing compounds for hollow spaces in any desired type of apparatus, for example, in electrical apparatus, and may be used especially in the manufacture of lead-sulfuric acid storage batteries because of their good adherent properties with respect to hard rubber surfaces. However, the products according to the present invention also exhibit good adherent properties with respect to metal surfaces. They are, therefore, useful for cementing various structural materials, such as metals, wood, and the like. Because of their slight tendency to shrink, the cemented structural materials do not need to be pressed together, although it is quite evident that the structural materials may be pressed together with any desired pressure, if desired, for example in order to keep the adhesive layer as thin as possible.

The following example is set forth to illustrate our invention and to enable persons skilled in the art to practice the invention and is not intended to limit the invention thereto.

*Example*

121 gm. dipotassium phthalate (½ mol), which contained 2.8% water and which was finely pulverized and screened, was heated with 325 gm. epichlorohydrin (about 3.5 mols) in a pressure vessel having a volume of 1 liter for 8 hours at 180° C. The air was displaced from the pressure vessel with the aid of nitrogen prior to heating. The maximum pressure during the reaction was 13 to 16 atmospheres. The light-brown reaction product was filtered off from the potassium chloride formed during the reaction. The reaction product, after washing with epichlorohydrin and drying in a vacuum, weighed 70 gm. (97% of theory). The excess epichlorohydrin in the filtrate was distilled off, toward the end in a vacuum of 4–5 mm. mercury, at a bath temperature of 150–170°C. and until no more volatile matter passed over. There were obtained 120 gm. (86% of theory calculated on the basis of esterification) of a dark-brown, clear resin, which barely flowed at room temperature. The resin had the following characteristic analytical values:

| | |
|---|---|
| Epoxide oxygen ___percent__ | 6.4 |
| Chlorine ___do____ | 2.3 |
| Saponification value | 392 |
| Hydroxyl value | 275 |
| Ash ___percent__ | 0.03 |
| Average molecular weight (dioxan) | 360 |

20 gm. of the liquid epoxy resin thus produced were admixed with 15 gm. hard rubber dust (screen fraction between 0.1 and 0.2 mm. light mesh, ash content 56% by weight), which was produced from used sulfur containing storage battery casings, and the mixture was stirred into a paste which was further admixed with 2 gm. triethylenetetramine. This mixture was spread on duralumin sheets 1 mm. thick and 20 mm. wide, and two such duralumin sheets were superimposed on each other such that the adhesive layer between the sheets extended for a length of 13 mm. (adhesive surface=13 x 20 mm.). The duralumin sheets were allowed to stand under light pressure for at least 6 hours at room temperature. Thereafter, the cemented sheets were subjected to a fatigue bending test; that is, the cemented piece was placed into a vise on one side and on the other side it was subjected to stresses acting vertically and symmetrically with respect to the adhesive layer; the forces acting on the cemented joint were adjusted to a constant kg./mm.$^2$ value based on the thickness of the duralumin sheets used.

The table below shows the number of alternate bends which were required at the indicated load to bring about a rupture. In this table, V indicates a rupture of the adhesive joint, B indicates a rupture of the duralumin sheet, KB indicates that no rupture of either the adhesive joint nor the duralumin sheet occurred after the indicated number of bends.

| Load in kg./mm.$^2$ | No. of Bends | Filler Used | Type of Rupture |
|---|---|---|---|
| 14 | 900,000 | yes | V (adhesive). |
| 12 | 50,000 | no | V (adhesive). |
| 12 | 3,000,000 | yes | B (metal). |
| 12 | 3,400,000 | yes | V (adhesive). |
| 10 | 2,500,000 | no | V (adhesive). |
| 10 | 20,000,000 | yes | KB (none). |
| 8 | 2,000,000 | no | V (adhesive). |
| 7 | 10,000,000 | no | V (adhesive). |

It may readily be seen that, provided the same load is applied, the rupture of the adhesive joints produced with the aid of the resins compounded in accordance with the invention occurs at a much higher number of bends than the rupture of those adhesive joints produced with resins which are not compounded as disclosed herein.

While we have set forth specific embodiments of our invention it will be understood that the invention is not limited thereto and that various modifications may be made thereof without departing from the spirit of the disclosure and the scope of the following claims.

We claim:

1. A hardenable resinous composition useful as sealing compound, adhesive and binding agent, comprising a diester of a benzene dicarboxylic acid and glycide, and hard rubber dust, having a particle size from about 0.001 to not greater than 0.5 mm. and in an amount from about 5 to 90% based on the weight of the mixture of said diester and said hard rubber dust.

2. A hardened resinous composition useful as a sealing compound, adhesive and binding agent, which comprises a diester of a benzene dicarboxylic acid and glycide, and hard rubber dust, having a particle size from about 0.001 to not greater than 0.5 mm. and in an amount from about 5 to 90% based on the weight of the mixture of said diester and said hard rubber dust, to which has been added from about 5 to 20% based on the weight of said diester of an organic amine hardening agent containing at least two amino groups in the molecule.

3. A hardened resinous composition useful as a sealing compound, adhesive and binding agent which comprises an ester of an aromatic polycarboxylic acid and glycide containing more than one glycide radical in the molecule, hard rubber dust having a particle size from about 0.001 to not greater than 0.5 mm. and in an amount from about 5 to 90% based on the weight of the mixture of said ester and said hard rubber dust and from about 5 to 20% based on the weight of said ester of an organic amine hardening agent containing at least two amino groups in the molecule.

4. A hardened resinous composition useful as a sealing compound, adhesive and binding agent which comprises an epoxy-ester product of a reaction between an alkali metal salt of an aromatic polycarboxylic acid and epichlorohydrin, said product containing more than one glycide radical in the product molecule, hard rubber dust, having a particle size between about 0.01 to 0.2 mm. and in an amount from about 25 to 50% based on the weight of the mixture of said epoxy-ester and said hard rubber dust and from about 5 to 20% based on the weight of said ester of organic amine hardening agent containing at least two amino groups in the molecule.

5. A hardened resinous composition useful as a sealing compound, adhesive and binding agent which comprises an epoxy ester product of the reaction between dipotassium phthalate and epichlorohydrin, hard rubber dust, having a particle size between about 0.01 to 0.2 mm. and in an amount from about 25 to 50% based on the weight of the mixture of said epoxy-ester and said hard rubber dust and from about 5 to 20% based on the weight of said epoxy-ester of triethylenetetramine.

6. The composition of claim 2, wherein the amine hardening agent contains from 1 to 10 carbon atoms per nitrogen atom in the molecule.

7. The composition of claim 2, wherein the composition is heated up to as high as 200° C. subsequent to the addition of the hardening agent.

References Cited in the file of this patent

UNITED STATES PATENTS

| 2,690,461 | Steeves | Sept. 28, 1954 |
| 2,761,870 | Payne et al. | Sept. 4, 1956 |
| 2,764,497 | Mika et al. | Sept. 25, 1956 |
| 2,801,232 | Suen et al. | July 30, 1957 |
| 2,865,897 | Raecke et al. | Dec. 23, 1958 |
| 2,895,947 | Shokal et al. | July 21, 1959 |

FOREIGN PATENTS

| 1,082,895 | France | June 23, 1954 |